Dec. 27, 1938.  L. L. SALFISBERG  2,141,318
RUBBER CONTAINER MANUFACTURE
Filed Jan. 19, 1937
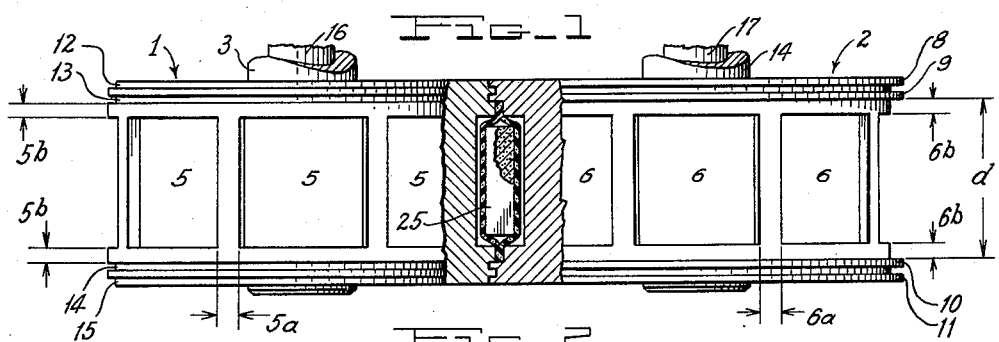
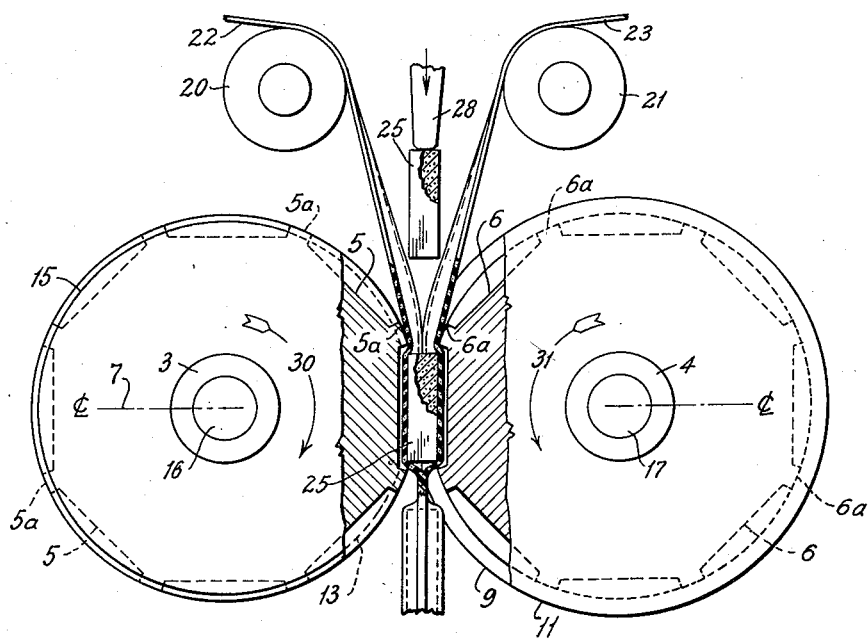
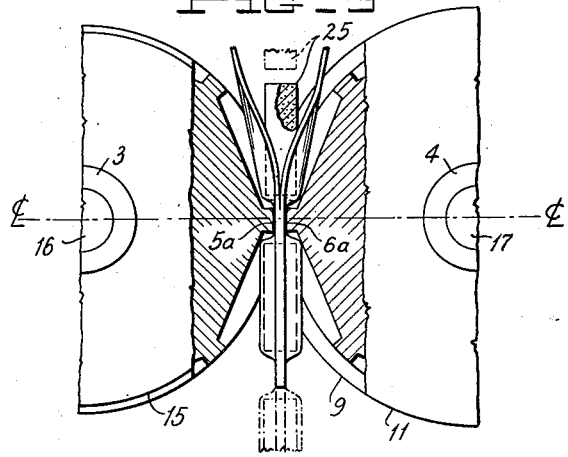
INVENTOR.
Leroy L. Salfisberg
BY Gordon B Scheitzell
ATTORNEY.

Patented Dec. 27, 1938

2,141,318

UNITED STATES PATENT OFFICE 2,141,318

RUBBER CONTAINER MANUFACTURE

Leroy L. Salfisberg, South Orange, N. J., assignor to Ivers-Lee Company, Newark, N. J., a corporation of Delaware Application January 19, 1937, Serial No. 121,265

2 Claims. (Cl. 18—56)

My invention pertains in general to the manufacture of rubber containers.

The principal object of the invention comprises providing apparatus and a method of manufacture for enclosing commodity articles in protective coverings composed of rubber and the like.

A further object of the invention comprises providing a system for molding rubber coverings around individual articles to produce a close-fitting, moisture-proof package without damaging the article in the molding process.

A still further object of the invention comprises providing a method of forming containers including the steps of stretching opposed layers of rubber on opposite sides of the article while fusing adjacent edges of the article under heat and pressure to complete the container fabrication and produce a completely enclosed unitary container structure.

These and other objects will be apparent from the following, reference being made to the accompanying drawing in which like reference numerals designate corresponding parts throughout and in which:

Fig. 1 is a plan view, partially sectioned, of one embodiment of container molding equipment employed in accordance with the invention.

Fig. 2 is an elevational view, partially sectioned, corresponding to the representation of Fig. 1; and Fig. 3 is a partial view of the representation of Fig. 2, but with the elements thereof in a different position in a molding and fabricating process.

The invention contemplates producing a sealed rubber container for individual articles and embraces a method of manufacture in which ribbon-like strips of rubber are fed to container-fabricating equipment which includes molding elements. This equipment feeds the strips of rubber material to provide stretched layers of the rubber on opposite sides of the commodity article. In this stretched condition, the opposed layers of the rubber are fused together within a continuously moving mold so that the rubber in the marginal areas surrounding the article is molded into a unitary structure. In accordance with the invention, the equipment is operated continuously and automatically to produce a chain of contiguous containers, each of which comprises a completely enclosed unitary and moisture-proof rubber receptacle. The exact details of the receptacle itself are disclosed in my copending application, Serial No. 112,112, filed November 21, 1936, and entitled Rubber package fabrication.

Referring to the drawing in detail, a pair of rotary molds 1 and 2 are mounted upon shafts 3 and 4 which are journaled in a suitable mechanical structure. The shafts 3 and 4 are provided with suitable gearing connected with a driving motor so that the shafts rotate in predetermined complementary engagement in a manner which will be hereinafter apparent. The mold 1 includes rectangular molding depressions 5, while the mold 2 has similar rectangular depressions 6. It will be recognized, of course, that, although rectangular depressions are shown, various other configurations may be employed when desired, and as occasion demands.

The rotary molds 1 and 2 are mounted in a manner such that the molding depressions 5 of mold 1 occupy the same rotative angular positions, but in an opposite direction, with respect to the molding depressions 6 of the rotary mold 2. That is, the molds 1 and 2 rotate in opposite directions so that the depressions 5 and 6 coincide along the center line 7. It will be seen that one side of the rotary mold 2 includes annular rings 8 and 9 and that the other side of the mold 2 includes annular rings 10 and 11. The rings 8 and 9 are adapted to neatly fit into corresponding annular channels 12 and 13 in the rotary mold 1, while the annular rings 10 and 11 make a neat rotative fit in channels 14 and 15 in the rotary mold 1. The shafts 3 and 4 are each provided with internal resistance elements 16 and 17 which, when connected with a suitable source of electric current, heat the molds 1 and 2 to predetermined temperatures.

Idler rollers 20 and 21 are suitable mechanically mounted immediately above the rotary molds 1 and 2 as shown in Fig. 2, and enable the ribbon-like strips 22 and 23 of rubber material to be fed intermediate the molds 1 and 2. The composition of strips 22 and 23 is such as to be suitable for the intended purpose, and is preferably of transparent rubber which has been subjected to a primary treatment usual for rubber material of this type.

The strips 22 and 23 are substantially of a width corresponding to the width "d" of the rotary molds 1 and 2, as shown in Fig. 1. In accordance with the invention, the strips 22 and 23 are fed between the molds 1 and 2, the complementary surfaces of the molds 1 and 2 being such as to accommodate the total thickness of the strips 22 and 23, as may be seen in the sectioned part of Fig. 1. According to the method of the invention, commodity articles are fed between the strips 22 and 23 at timed intervals with respect to the rotation of the molds 1 and 2. Various commodity articles may be used in this system, but for purposes of illustration, rectangular articles 25 are shown used. These articles, as shown, have sharp corners and are of a hard substance, since the container structure produced in accordance with the invention is particularly well adapted to accommodate such articles.

As shown in Figs. 1 and 2, the molding depressions 5 of the rotary mold 1 are separated by transverse bars 5a, and the molding depressions 6 are separated by transverse bars 6a. When, as represented in Fig. 2, opposed bars 5a and 6a are in a position a short distance above the line 7, and before coming into actual engagement along the line 7 in the path of rotation of the molds 1 and 2, a pocket is formed in the strips 22 and 23 to receive the article 25. This pocket is sufficiently closed by the bars 5a and 6a, as shown in Fig. 2, to prevent the article 25 from falling therethrough. The article 25 is deposited in this pocket and held therein by some suitable means such as a mechanical element 28. The mechanical element 28 holds the article 25 between the strips 22 and 23 while the molds 1 and 2 are rotated in the direction of the arrows 30 and 31. When the bars 5a and 6a come into alignment with each other along the line 7, the heat and pressure applied therebetween will cause the rubber to fuse together in areas intermediate the articles 25. As the article 25 is passed through the rotary rolls, the subsequently engaging bars 5a and 6a apply heat and pressure across the strips 22 and 23 at the other end of the article 25 to fuse the same as before. At the same time, the side walls 5b and 6b will have applied sufficient heat and pressure to fuse the rubber on the sides of the articles 25, whereby a complete sealing flange is formed around the enclosed commodity. Each commodity is therefore completely enclosed by a unitary structure.

It is a feature of the invention that the strips 22 and 23 are fed through the rotary molds 1 and 2 under a slight tension to enable the bars 5a and 6a to stretch the rubber material around the corners of the articles 25 so that the opposed walls of the strips 22 and 23 make a very tight and close-fitting container.

Fig. 3 further illustrates the action of the rotary molds 1 and 2 showing typical bars 5a and 6a in complementary engagement along the line 7, at which point the maximum pressure and heat is applied transversely of the strips 22 and 23 intermediate the articles 25.

Upon the completion of the molding process, the rubber container structures are stored in curing rooms for a period of approximately three weeks. At the completion of this curing period, the fabrication of the container is complete.

The finished article comprises a container which is resilient and tough, and completely impervious to water and most chemicals. Although a preferred method and apparatus for rubber container manufacture has been disclosed, it will be recognized that various changes and modifications can be made without departing from the intended scope of the invention. Therefore, no limitation is intended other than as is imposed by the scope of the appended claims.

What is claimed as new and original and desired to be secured by Letters Patent of the United States is:

1. The method of packaging articles in material capable of being softened under heat, consisting in continuously feeding strips of said material in opposed relation to each other, pressing small areas of longitudinal zones of said strips into contact with each other progressively longitudinally of the strips, pressing said strips together periodically along spaced zones transverse of the strips, heating the contacting portions of said strips in the longitudinal zones and said transverse zones while they are being pressed together to form longitudinal and transverse seals respectively and maintaining the other portions of the strips spaced from each other and free from heat and pressure, and depositing an article between said strips subsequently to the formation of one transverse seal and prior to the formation of the next following transverse seal to form a chain of hermetically sealed packages each containing an article.

2. The method of packaging articles in rubber material capable of softening under heat, consisting in feeding sheets of said rubber material in opposed spaced relation to each other under longitudinal tension, simultaneously heating and pressing together said sheets along a zone extending transversely across said sheets to form a transverse seal, depositing an article between said sheets above said seal so that the article is held spaced from the seal by contact with the unsealed portions of the sheets, continuing feeding of said sheets with said article between them and simultaneously heating and pressing together small areas only of said sheets progressively along the longitudinal marginal zones of said sheets in spaced relation to said article to form longitudinal seals while maintaining the other portions of the sheets unheated and free from pressure and at the same time stretching said unheated portions of the sheets over the article, and then simultaneously heating and pressing together said sheets along another zone transverse of said sheets in spaced relation to and at the side of said article opposite the first transverse seal to form a second transverse seal and complete a hermetically sealed package containing said article spaced from all of said seals.

LEROY L. SALFISBERG.